April 23, 1963   G. W. HARTZELL   3,086,568
SAWMILL SET MECHANISM CONTROL
Filed Dec. 30, 1960   2 Sheets-Sheet 2
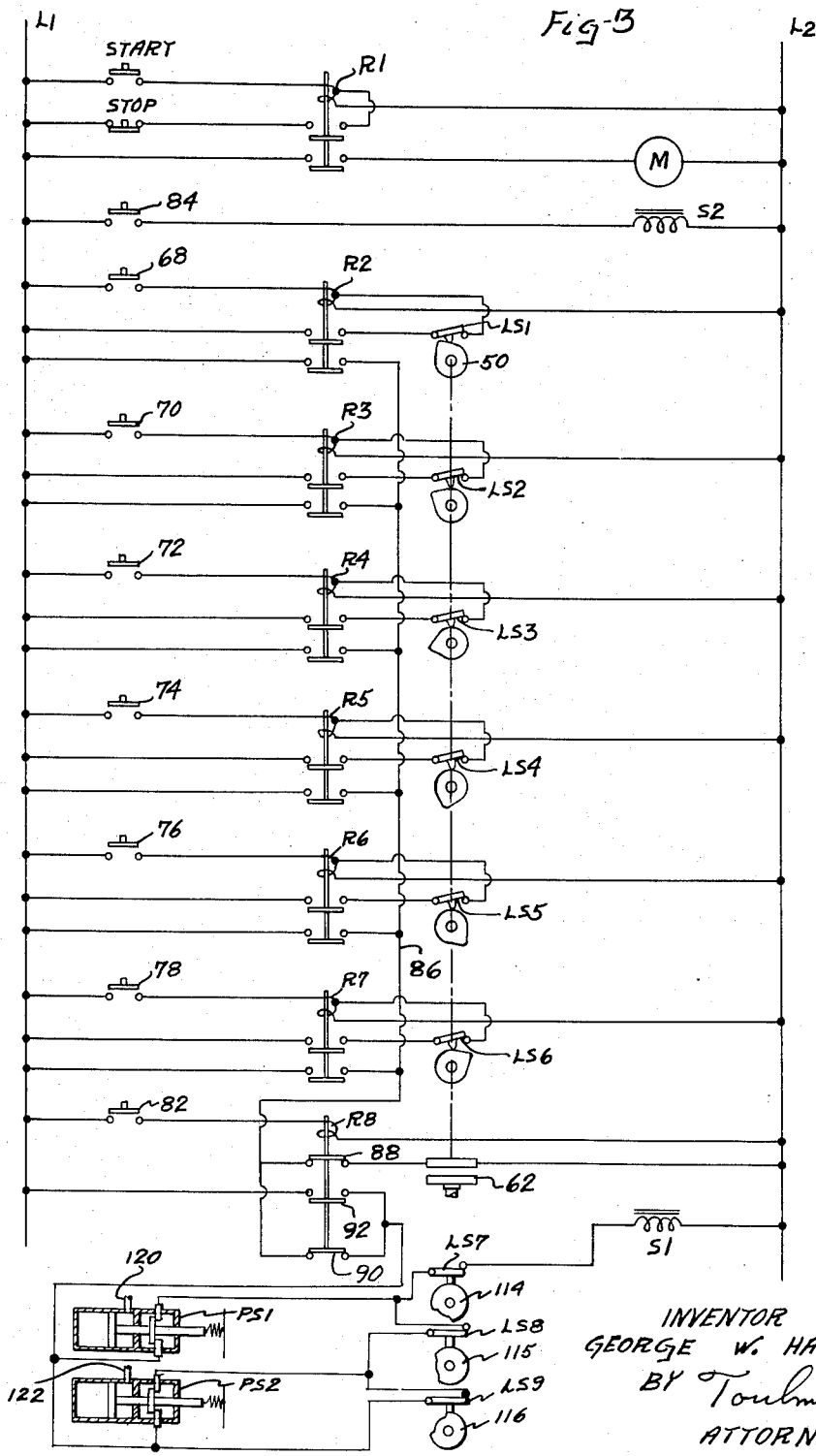
INVENTOR
GEORGE W. HARTZELL
BY Toulmin & Toulmin
ATTORNEYS United States Patent Office 3,086,568
Patented Apr. 23, 1963

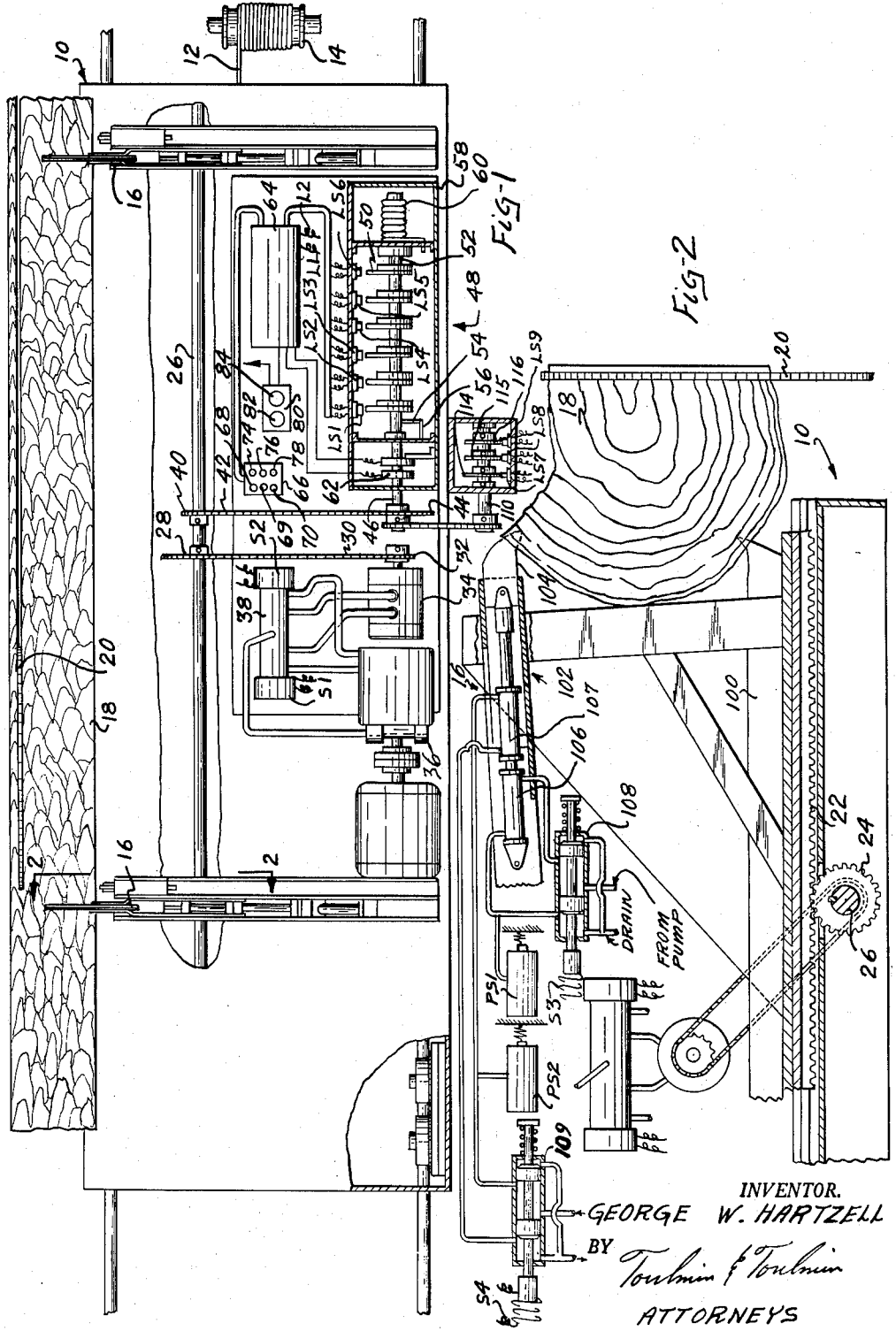

3,086,568
SAWMILL SET MECHANISM CONTROL
George W. Hartzell, Piqua, Ohio, assignor to Hartzell Industries, Inc., Piqua, Ohio, a corporation of Ohio
Filed Dec. 30, 1960, Ser. No. 79,761
14 Claims. (Cl. 143—126)

This invention relates to an improved arrangement for actuating and controlling the set mechanism of a sawing rig.

Sawing rigs for sawing logs into boards of predetermined widths are known but heretofore such set mechanisms have been generally manually operated or have been motorized with electric motors. The manual operation of the set mechanisms is time-consuming and the electric operators have tended to detract from precision of adjustment of the set mechanism because of the inertia developed in the electric motor.

Accordingly, a primary object of the present invention is to provide a convenient automatic mechanism for adjusting the set mechanism of a sawing rig.

Still another object of this invention is the provision of an automatic arrangement for adjusting the set mechanism of a sawing rig which can be incorporated in existing equipment.

Still another object of this invention is the provision of an automatic mechanism for adjusting the set mechanism of a sawing rig which will be relatively inexpensive and which is easily adjusted and controlled.

Still another object of this invention is the provision of an arrangement for automatically adjusting the set mechanism of the sawing rig which provides for fine adjustment but in which relatively large adjusting movements can readily be made.

The foregoing objects as well as other objects and advantages of this invention will become more apparent upon reference to the following specification taken in connection with the accompanying drawings in which:

FIGURE 1 is a plan view, rather diagrammatic of a sawing rig having a set mechanism adjusting arrangement according to this invention;

FIGURE 2 is a sectional view indicated by line 2—2 on FIGURE 1 showing, generally, the movable log-gripping jaw arrangement of the sawmill carriage; and, FIGURE 3 is a diagrammatic representation of the electric control circuit of the automatic arrangement of this invention.

Referring to the drawings somewhat more in detail, FIGURE 1 illustrates somewhat diagrammatically a sawing rig in which there is a reciprocating carriage 10 mounted on guide rails or the like in a conventional manner. Reciprocation of the carriage may be accomplished by cable means or the like as at 12 running over reversibly driven pulleys 14.

Mounted on the carriage are two or more knee assemblies and dogging arrangements 16, which may be of a conventional type and which are adapted for gripping a log 18 that is to be sawed into boards by a saw arrangement designated at 20 which may, for example, be a rotary saw or a band saw.

The knee assemblies 16 are guided on carriage 10 for movement toward and away from the saw 20 so as to move the log relative to the saw thereby to determine the thickness of the board that is to be cut from the board. Each knee assembly includes a rack 22 engaged by a pinion 24 on a shaft 26. It will be evident that rotation of shaft 26 will rotate all of the pinions 24 thereon and move the respective dogging arrangements on carriage 10 in unison and by equal amounts.

The individual dogging arrangements usually have individual adjustments also which can be availed of for adjusting the dogging arrangements independently of each other as may be necessitated by the configuration of the log to be gripped thereby.

According to the present invention, shaft 26 has a sprocket 28 fixed thereto over which runs a chain 30 that also engages a sprocket 32 on the output shaft of a rotary hydraulic motor 34. Motor 34 is reversibly supplied with energizing fluid from a pump 36 that is connected with the motor by way of a four-way reversing valve 38.

This reversing valve is normally centered to prevent the supply of fluid to or the exhaust of fluid from motor 34 and is movable in one direction by energization of a solenoid S1 to cause motor 34 to run in a forward direction and is movable in the other direction by energization of a solenoid S2 to cause the motor to run in the reverse direction. Forward direction means the direction of rotation of motor 34 which will produce movement of the dogging arrangements toward saw 20. In reverse rotation thereof, it will move the dogging arrangements away from the saw blade.

Shaft 26 also has mounted thereon a sprocket 40 over which passes chain 42 that also passes around a sprocket 44 on shaft 46 of control unit 48.

Located within control unit 48 are a plurality of limit switches LS1, LS2, LS3, LS4, LS5 and LS6. Pertaining to each of these limit switches is an actuating cam 50 adjustably mounted on a shaft 52 which is axially aligned with shaft 46 but which is not connected thereto. Shaft 52 has a predetermined stopped position which may be determined by the stop finger 54 thereon and the abutment 56 in the housing 58 of the control unit.

Shaft 52 is normally biased toward its stopped position by a torsion spring 60 connected between the shaft and the frame of the control unit.

An electric clutch 62 is provided which, when energized, drivingly interconnects shafts 46 and 52 for rotation as a unit and, when deenergized, interrupts the driving connection between the shafts whereby shaft 52 can be returned to its stopped position by spring 60.

The control system according to this invention comprises a relay unit 64 in circuit with the limit switch, above referred to, and also connected in circuit with a push button station 66 conveniently located for operation by the sawyer operating the sawing rig. The push button station comprises a plurality of push buttons 68, 70, 72, 74, 76, and 78, each pertaining to a different one of the aforementioned limit switches.

A second push button panel 80 is also provided, which may be integral with panel 66, if so desired, in which panel 80 comprises a forward push button 82, and reverse push button 84.

The several limit switches and push buttons are connected in circuit as illustrated in FIGURE 3 for controlling the operation of the set mechanism. In FIGURE 3, the power lines are indicated at L1 and L2 and connected therebetween is a relay R1 for controlling the energization of drive motor M for pump 36. This relay can be energized by closing the start switch and can be deenergized by opening the stop switch.

Also connected between lines L1 and L2 is the aforementioned reverse solenoid S2 in series with the normally open push button 84.

The several push buttons of panel 66 are identified in FIGURE 3 by the same numerals employed therefor in FIGURE 1 and pertaining to each thereof is a relay. These relays are indicated at R2, R3, R4, R5, R6 and R7. Each relay is energized when its pertaining push button is closed and remains energized through a holding circuit that includes the upper blade of the relay and the limit switch pertaining thereto that is located in the control unit 48. Upon closing of any of the push buttons pertaining to the said relays, the relay will close and remain energized until its pertaining cam 50 engages and opens the pertaining limit switch and whereupon the said relay will become deenergized.

Each of the said relays comprises, in addition to the blade thereof in the holding circuit, a second blade and these blades are all connected in parallel between power line L1 and a wire 86 which leads through a normally closed blade 88 of a normally deenergized relay R8 to the energizing coil of electric clutch 62. Wire 86 is also connected through a second normally closed blade 90 of relay R8 with the forward solenoid S1.

The wire 86 in establishing the circuit to forward solenoid S1 is connected through a normally closed pressure switch PS1 and a normally closed limit switch LS1 with solenoid S1.

Wire 86 is also connected through a normally closed pressure switch PS2 and a normally closed limit switch LS8 and the aforementioned normally closed limit switch LS7 with S1. Wire 86 is also connected through a normally closed limit switch LS9 and then through the aforementioned limit switches LS8 and LS7 with solenoid S1.

The arrangement provides for bypassing switches LS7 and LS8 so that normally only switch LS9 is effective for limiting outward movement of the knee assembly. However, opening of either of the pressure switches PS1 or PS2 in response to the outward movement of the jaw on the knee assembly will make the pertaining switch LS7 or LS8 effective thereby to provide a new stopping position for the knee assembly.

At this point, it will be apparent that closing of any of push buttons 68 through 78 will bring about energization of its pertaining relay while simultaneously clutch 62 is energized and forward solenoid S1 is energized. This will bring about rotation of hydraulic motor 34 in a direction to move the dog structures, and a log carried thereby, outwardly toward saw 20 until the cam pertaining to the push button which was depressed engages and opens its pertaining limit switch.

When the said limit switch is opened by the cam, the energized relay is deenergized and this will also deenergize forward solenoid S1 so that motor 34 will immediately come to a halt while simultaneously clutch 62 is deenergized thereby releasing shaft 52 to the influence of the spring 60 which returns the shaft to its initial stopped position. By adjusting the several cams to the proper angular positions on shaft 52, the desired thickness of boards can be obtained by depressing the proper push button when the carriage has retracted beyond the saw so that the log can be shifted to a new position before the platform again traverses past the saw position.

In the arrangement illustrated, six different thicknesses of boards can be cut by depressing any of the six different push buttons on panel 66. While this normally would represent enough different thicknesses, the control unit can be made larger and have more limit switches and more cams therein, if so desired, to provide for even more automatic adjustments of the set mechanism.

After the sawing of a log is completed and prior to commencing the sawing of another log, the jaw mechanisms are retracted and this can be done by depressing push button 84 which will energize reverse solenoid S2 and provide for continuous rotation of motor 34 in the reverse direction until push button 84 is released. At this time, the control unit is not effective because the clutch 62 is not energized.

Should it be desired to advance the jaw arrangements in the forward direction without availing of the control unit, the forward push button 82 is depressed and this will energize relay R8 which will open its blade 88 thus interrupting the clutch energizing circuit. At the same time, a blade 92 is closed by the relay which establishes a circuit to solenoid S1 which will cause the motor 34 to run in the forward direction for as long as push button 82 is closed.

The knee assembly comprises jaws as illustrated in FIGURE 2 wherein 100 designates the lower jaw and 102 designates the upper jaw. These jaws are driven toward and away from each other by mechanisms not shown in a conventional manner. The upper jaw comprises a jaw portion or dog 104 movable outwardly of the knee assembly by energization of hydraulic motor means 106 and 107 connected thereto.

Control valves 108 and 109 are normally spring urged toward position to cause retraction of dog 104 and upon energization of solenoids S3 and S4, the valves are shifted to cause the dog 104 to move outwardly of the knee assembly a predetermined amount.

On account of the three different positions that can be occupied by dog 104, it is advantageous to provide means for limiting the outward movement of the knee assembly on the carriage to prevent the jaws from being moved into the path of saw 20.

According to this invention, this is accomplished by connecting a third shaft 110 to shaft 26 as by establishing a chain drive or gear drive 112 between shaft 110 and shaft 46 which, in turn, is connected by a chain with shaft 26. On shaft 110 are three cams 114, 115, and 116 with which are associated the switches LS7, LS8, and LS9, respectively. These switches are normally closed and will be opened sequentially by their respective cams with one switch opening so as to halt outward movement of the jaw assembly before dog 104 is moved into the path of saw 20 when the dog is in its extreme extended position, another switch opening so as to halt the outward movement of the jaw assembly when the dog is in its intermediate position, and with the third switch opening to stop outward movement of the knee assembly before any portion thereof moves into the path of saw 20 when dog 104 is in its retracted position.

This safety feature is connected into the electrical circuit of FIGURE 3 in the following manner:

The line through S1 has in series therein the limit switches LS7, LS8, and LS9 which are all held closed by their respective cams 114, 115, and 116. By-passing switch LS8 is a pressure switch PS1 and by-passing switch LS9 is a pressure switch PS2. These pressure switches are normally closed thus making the limit switches which they by-pass ineffective. The pressure switches will be closed when the hydraulic motor means 106 and 107 are both energized in a direction to retract jaw 104 so that the stop arrangement is not effective until switch LS7 drops open at the furthermost extended position of the knee assembly means.

However, upon energization of motor 106 by energization of valve solenoid S3 to move the dog to an intermediate position, switch PS1 will be urged open by a supply of pressure thereto via conduit 120 whereas, energization of hydraulic motor 107 to move the jaw outwardly which will come about upon energization of valve solenoid S4, will cause opening of pressure switch PS2 by supply of pressure fluid thereto via conduit 122. Opening of either of the pressure switches will make the pertaining by passed limit switch effective to establish a new stopping position for the knee assembly during the outward movement thereof.

The safety feature, referred to above, is of merit in connection with the automatic set mechanism control of the present invention, but it will be evident that the stop means described could also be employed with a set mechanism having no automatic control.

From the foregoing, it will be seen that the arrangement of the present invention is relatively simple but at the same time is highly effective for controlling the adjustment of the set mechanism. Inertia problems are eliminated by blocking motor 34 as soon as reversing valve 38 centers. Repetitive adjustments of the set mechanism of the same amount can be accomplished because shaft 52 always returns to its starting position following an adjusting operation.

The unit is relatively compact and inexpensive and is composed of a relatively few easily manufactured and easily serviced parts.

It will be understood that this invention is susceptible to modification in order to adapt it to different usages and conditions; and, accordingly, it is desired to comprehend such modifications within this invention as may fall within the scope of the appended claims.

I claim:

1. In combination; a carriage, a work support assembly thereon, a first shaft on the carriage rotatable for adjusting the support assembly thereon, and means for controllably driving said shaft comprising a liquid hydraulic motor continuously connected to the shaft, a source of hydraulic liquid under pressure, a closed center reversing valve connected between said source and said motor, electrical means energizable for shifting said valve to cause operation of said motor, limit switch means in circuit with said electrical means actuable for deenergizing said electrical means to cause immediate halting of said motor, cam means for actuating said limit switch means, a second shaft supporting said cam means rotatable for causing said cam means to actuate said limit switch means sequentially, means operable simultaneously with the energization of said electrical means for drivingly interconnecting said first and second shafts, and means for making a selected one of said limit switch means effective for controlling said electrical means.

2. In combination; a carriage, a work support assembly thereon, a first shaft on the carriage rotatable for adjusting the support assembly thereon, and means for controllably driving said shaft comprising a liquid hydraulic motor continuously connected to the shaft, a source of hydraulic liquid under pressure, a closed center reversing valve connected between said source and said motor, electrical means energizable for shifting said valve to cause operation of said motor, limit switch means adapted for being connected in circuit with said electrical means actuatable for deenergizing said electrical means to cause immediate halting of said motor, cam means for actuating said limit switch means, a second shaft supporting said cam means rotatable for causing said cam means to actuate said limit switch means sequentially, means operable upon energization of said electrical means for drivingly connecting said second shaft to said first shaft and upon deenergization of said electrical means for disconnecting said second shaft from said first shaft, and means for connecting a selected one of said limit switch means in circuit with said electrical means while simultaneously energizing said electrical means.

3. In combination; a carriage, a work support assembly thereon, a first shaft on the carriage rotatable for adjusting the support assembly thereon, and means for controllably driving said shaft comprising a liquid hydraulic motor continuously connected to the shaft, a source of hydraulic liquid under pressure, a closed center reversing valve connected between said source and said motor, electrical means energizable for shifting said valve to cause operation of said motor, limit switch means in circuit with said electrical means operable for de-energizing said electrical means to cause immediate halting of said motor, cam means controlling said limit switch means, a second shaft supporting said cam means, and means operable upon energization of said electrical means for drivingly connecting said second shaft to said first shaft and upon deenergization of said electrical means for disconnecting said second shaft from said first shaft, there being means associated with said second shaft biasing it toward a predetermined starting position operable to return the second shaft to said starting position upon disconnection of the second shaft from the first shaft.

4. In combination; a carriage, a work support assembly thereon, a first shaft on the carriage rotatable for adjusting the support assembly thereon, and means for controllably driving said shaft comprising a liquid hydraulic motor continuously connected to the shaft, a source of hydraulic liquid under pressure, a closed center reversing valve connected between said source and said motor, electrical means energizable for shifting said valve to cause operation of said motor, relay means energizable for energizing said electrical means, manual switch means operable to energize said relay means, normally closed limit switch means in circuit with said relay means operable for de-energizing said relay means to cause immediate halting of said motor, cam means associated with said limit switch means, a second shaft supporting said cam means rotatable for causing the cam means to open the limit switch means and deenergize the relay means and therethrough to deenergize the electrical means to halt the motor, a clutch between said first and second shaft, and means operable upon energization of said relay means to engage said clutch and upon deenergization of said relay means to disengage said clutch.

5. In combination; a sawmill carriage, a knee assembly thereon, a first shaft on the carriage rotatable for adjusting the knee assembly thereon, and means for controllably driving said shaft comprising a liquid hydraulic motor continuously connected to the shaft, a source of hydraulic liquid under pressure, a closed center reversing valve connected between said source and said motor, electrical means energizable for shifting said valve to cause operation of said motor, a plurality of relays, a push button for each relay closeable to energize the pertaining relay, a holding circuit for each relay and a normally closed limit switch therein, a normally open blade on each relay connected in circuit with said electrical means so energization of any relay will cause energization of said electrical means, a cam for each limit switch, a second shaft on which said cams are arranged so rotation of said second shaft will cause sequential opening of said limit switches to de-energize the pertaining said relay thereby de-energizing said electrical means to cause immediate halting of said motor, an electrically operated clutch connecting said first and second shafts, said clutch being in circuit with said electrical means for simultaneous energization and deenergization therewith.

6. In combination; a sawmill carriage, a knee assembly thereon, a first shaft on the carriage rotatable for adjusting the knee assembly thereon, and means for controllably driving said shaft comprising a liquid hydraulic motor continuously connected to the shaft, a source of hydraulic liquid under pressure, a closed center reversing valve connected between said source and said motor, electrical means energizable for shifting said valve to cause operation of said motor, a plurality of relays, a push button for each relay closeable to energize the pertaining relay, a holding circuit for each relay and a normally closed limit switch therein, a normally open blade on each relay connected in circuit with said electrical means so energization of any relay will cause energization of said electrical means, a cam for each limit switch, a second shaft on which said cams are arranged so rotation of said second shaft will cause sequential opening of said limit switches to de-energize the pertaining relays thereby to de-energize said electrical means to cause immediate halting of said motor, an electrically operated clutch connecting said first and second shafts, said clutch being in circuit with said electrical means for simultaneous energization and deenergization therewith, there being auxiliary switch means operable to cause energization of said electrical means while interrupting the circuit to said clutch to permit selective traversing of said knee assembly independently of the actuation of said limit switches.

7. In combination with a sawmill carriage and knee assembly means thereon, there being a first shaft on the carriage rotatable for adjusting the knee assembly means thereon; of a liquid hydraulic motor continuously connected to said shaft, a source of hydraulic liquid under pressure, a normally centered closed center four-way reversing valve connecting said source with said motor, a first solenoid associated with the valve energizable for shifting the valve in a direction to cause forward rotation of the motor to adjust the knee assembly means outwardly on said carriage, a second solenoid associated with the valve energizable for shifting the valve in a direction to cause reverse rotation of said motor, said valve in its normally centered position preventing rotation of the motor, a plurality of relays, a push button for each relay closeable to energize the pertaining relay, a holding circuit for each relay and a limit switch therein, a cam for each limit switch, a second shaft on which said cams are mounted so rotation of said second shaft will cause sequential actuation of said limit switches, a normally open blade on each relay in circuit with said first solenoid so energization of any relay will energize said first solenoid and cause outward movement of said knee assembly means until the limit switch associated with the energized relay is actuated, a normally disengaged clutch between said first and second shafts, an electric operator for the clutch energizable to engage the clutch, said operator being in circuit with said first solenoid, a manual switch operable to energize said first solenoid while interrupting the circuit to said electric operator for traversing said knee assembly means outwardly independently of the actuation of said limit switches, and another manual switch operable for energizing said second solenoid for traversing said knee assembly means inwardly.

8. In a control system for controlling the movement of a knee assembly on a sawmill carriage; a liquid hydraulic motor continuously connected to the knee assembly for effecting movements thereof, a source of hydraulic liquid under pressure, a normally centered closed center reversing valve connected between said source and motor, electrical means energizable for shifting said valve to cause operation of said motor, limit switch means in circuit with said electrical means, cam means controlling said limit switch means, a shaft supporting said cam means, and means operable simultaneously with the energization of the said electrical means for drivingly connecting the shaft with said hydraulic motor for rotation thereby.

9. In a control system for controlling the movement of a knee assembly on a sawmill carriage; a reversible liquid hydraulic motor continuously connected with the knee assembly for moving the knee assembly in respectively opposite directions on the carriage, a source of hydraulic liquid under pressure, a normally centered closed center reversing valve connected between said source and said motor, first and second electrical means associated with the valve selectively energizable for causing respectively opposite directions of operation of said motor, limit switch means associated with one of said electrical means, cam means associated with said limit switch means, a shaft supporting said cam means, an electric clutch between the motor and shaft energizable for drivingly connecting the shaft to the motor, first control means operable for simultaneously energizing said one electrical means and said clutch, second control means operable for selectively energizing said one electrical means independently of said clutch, and third control means operable for selectively energizing the other of said electrical means.

10. In a sawing rig having a carriage and a saw adjacent thereto and knee assembly means on the carriage having jaws and movable thereon toward and away from the saw; control means selectively operable for moving at least one of said jaws on the knee assembly means outwardly thereon toward the saw, and stop means operable for limiting the outward movement of the knee assembly means on the carriage to prevent movement of the jaws thereof into the plane of said saw, said stop means comprising a first switch adapted for being actuated in response to a predetermined outward movement of the knee assembly means on said carriage and operable when actuated to prevent further outward movement of said knee assembly means, and a second switch adapted for being actuated in response to a lesser outward movement of the knee assembly means on the carriage and also operable when actuated for preventing further outward movement of the said knee assembly means, a normally closed bypass switch bypassing said second switch to make the second switch ineffective, and means under the control of said control means for opening said bypass switch to make said second switch effective when said one of said jaws is moved outwardly.

11. In combination; a sawmill carriage, a knee assembly thereon, a first shaft on the carriage rotatable for adjusting the knee assembly thereon, and means for controllably driving said shaft comprising a liquid hydraulic motor connected to the shaft, a source of hydraulic liquid under pressure, a closed center reversing valve connected between said source and said motor, electrical means energizable for shifting said valve to cause operation of said motor, a plurality of relays, a push button for each relay closeable to energize the pertaining relay, a holding circuit for each relay and a normally closed limit switch therein, a normally open blade on each relay connected in circuit with said electrical means so energization of any relay will cause energization of said electrical means, a cam for each limit switch, a second shaft on which said cams are arranged so rotation of said second shaft will cause sequential opening of said limit switches, an electrically operated clutch connectitng said first and second shafts, said clutch being in circuit with said electrical means for simultaneous energization and deenergization therewith, jaw means on the knee assembly selectively movable outwardly toward a saw adjacent said carriage, and means operable for interrupting the circuit to said plurality of relays in response to outward movement of said knee assembly on the carriage, said last mentioned means comprising first switch means arranged for actuation by the knee assembly in a first adjusted position of said knee assembly, second switch means arranged for actuation by the knee assembly in a second adjusted position of said knee assembly, a bypass switch bypassing said second switch means to make the second switch means normally ineffective, and operable in response to outward movement of the jaw means on the knee assembly for opening said bypass switch.

12. In a sawing rig having a carriage and a saw adjacent thereto and a knee assembly means on the carriage having jaws and movable on the carriage toward and away from the saw; hydraulic motor means connected between the knee assembly and at least one jaw thereon operable for moving the said one jaw outwardly on the knee assembly means toward the saw, stop means operable for limiting the outward movement of the knee assembly means on the carriage to prevent the jaws thereon from being moved into the plane of said saw, said stop means comprising a plurality of limit switches, cam means pertaining to said limit switches driven in unison with the outward movement of said knee assembly means operable for actuating said limit switches sequentially, a normally closed pressure operable switch by-passing at least one of said plurality of limit switches, and means operable simultaneously with the supply of pressure to said hydraulic motor means to move the said one jaw outwardly for supplying pressure to said pressure switch for actuating said pressure switch into open position to make its pertaining by-passed limit switch effective.

13. In a sawing rig having a carriage and a saw adjacent thereto and knee assembly means movably mounted on the carriage for movement thereon toward and away from the saw; a pair of hydraulic motors connected in tandem between the knee assembly means and at least one of said jaws selectively energizable for moving said one of said jaws outwardly on the knee assembly means toward the saw, means for moving said knee assembly means on the carriage toward and away from said saw, and stop means selectively operable for making said knee assembly moving means ineffective thereby to limit outward movement of the knee assembly means on the carriage toward the saw to prevent movement of the jaws thereof into the plane of said saw, said stop means comprising a plurality of limit switches connected in series and in the energizing circuit for said knee assembly moving means, a cam for each limit switch normally holding the pertaining limit switch closed, said cams being connected for movement with said knee assembly means and being arranged to actuate their pertaining limit switches into open position sequentially, a normally closed pressure switch by-passing each of two of said serially connected limit switches, and hydraulic means respectively connecting said pressure switches with the hydraulic motors pertaining to said one jaw for opening the pressure switches individually upon energization of the respective one of said hydraulic motor means to move said one jaw outwardly on the knee assembly means.

14. In a sawing rig having a carriage and a saw adjacent thereto; knee assembly means on the carriage, a jaw on the knee assembly means, hydraulic motors connected in tandem between the knee assembly means and said one jaw selectively energizable for moving the jaw outwardly on the knee assembly means, means for moving said knee assembly means outwardly on the carriage toward the saw, said last mentioned means including a solenoid energizable for effecting the said outward movement of the knee assembly means on the carriage, stop means for limiting the outward movement of the knee assembly means on the carriage comprising a plurality of limit switches connected serially and in series with said electrical means, a cam for each limit switch normally holding its pertaining limit switch closed, means connecting said cams with said knee assembly means for movement simultaneously therewith, said cams being arranged for sequentially opening their respective limit switches as the knee assembly means moves outwardly on the carriage, normally closed pressure switches by-passing the two of said limit switches which are first actuated by their respective cams as the knee assembly means moves outwardly on the carriage, and means connecting each said pressure switch with one of said hydraulic motors for opening of the pressure switch upon energization of the pertaining hydraulic motor to move the said one jaw outwardly on the knee assembly means whereby to make the limit switch by-passed by the opened pressure switch effective for stopping the outward movement of the assembly means on the carriage before the said one jaw in its extended position moves into the path of said saw.

References Cited in the file of this patent
UNITED STATES PATENTS

| | | |
|---|---|---|
| 796,925 | McDermott | Aug. 8, 1905 |
| 2,661,036 | Balch et al. | Dec. 1, 1953 |
| 2,707,501 | Craik | May 3, 1955 |
| 2,850,130 | Mater | Sept. 2, 1958 |
| 2,888,047 | Worth et al. | May 26, 1959 |
| 2,893,448 | Elworthy | July 7, 1959 |